United States Patent
Liu et al.

(10) Patent No.: US 9,123,953 B2
(45) Date of Patent: Sep. 1, 2015

(54) METHOD FOR MODIFYING POSITIVE ELECTRODE MATERIALS FOR LITHIUM-ION BATTERIES

(71) Applicant: SHEN ZHEN UNIVERSITY, Shenzhen (CN)

(72) Inventors: Jianhong Liu, Shenzhen (CN); Dayong Gui, Shenzhen (CN); Qianling Zhang, Shenzhen (CN); Chuanxin He, Shenzhen (CN); Caizhen Zhu, Shenzhen (CN)

(73) Assignee: Shen Zhen University, Shenzhen (CN)

( * ) Notice: Subject to any disclaimer, the term of this patent is extended or adjusted under 35 U.S.C. 154(b) by 276 days.

(21) Appl. No.: 13/924,674

(22) Filed: Jun. 24, 2013

(65) Prior Publication Data
US 2013/0277620 A1    Oct. 24, 2013

Related U.S. Application Data

(63) Continuation-in-part of application No. PCT/CN2011/084676, filed on Dec. 26, 2011.

(30) Foreign Application Priority Data

Dec. 31, 2010   (CN) .......................... 2010 1 0618690

(51) Int. Cl.
| | | |
|---|---|---|
| *H01M 4/88* | (2006.01) | |
| *H01M 4/36* | (2006.01) | |
| *H01M 4/1391* | (2010.01) | |
| *H01M 4/62* | (2006.01) | |
| *H01M 4/131* | (2010.01) | |

(52) U.S. Cl.
CPC ............ *H01M 4/364* (2013.01); *H01M 4/1391* (2013.01); *H01M 4/625* (2013.01); *H01M 4/131* (2013.01); *Y02E 60/122* (2013.01)

(58) Field of Classification Search
CPC .. B82Y 30/00; C01B 31/002; C01B 31/0226; H01B 4/366; H01B 4/625; H01B 4/1391
USPC ................................ 252/182.1, 506; 429/217
See application file for complete search history.

(56) References Cited

U.S. PATENT DOCUMENTS

2006/0222952 A1*  10/2006  Kono et al. .............. 429/231.95

\* cited by examiner

*Primary Examiner* — Khanh Tuan Nguyen
(74) *Attorney, Agent, or Firm* — Matthias Scholl P.C.; Matthias Scholl

(57)                ABSTRACT

A method for modifying a positive electrode material for a lithium-ion battery. The method includes: a) stirring a liquid polyacrylonitrile (LPAN) solution at the temperature of between 80 and 300° C. for between 8 and 72 h to yield a cyclized LPAN solution; b) adding positive electrode material for a lithium-ion battery, in a powder form, to the cyclized LPAN solution, and evenly mixing a resulting mixture; c) grinding the mixture, and drying the mixture at room temperature; and d) calcining the mixture at the temperature of between 500 and 1800° C. for between 6 and 24 h in the presence of an inert gas to form a graphene-like structure by the cyclized LPAN. The graphene-like structure is evenly distributed in the positive electrode material of the lithium-ion battery to yield a graphene-like structure modified positive electrode material of the lithium-ion battery.

10 Claims, 1 Drawing Sheet

METHOD FOR MODIFYING POSITIVE ELECTRODE MATERIALS FOR LITHIUM-ION BATTERIES

CROSS-REFERENCE TO RELATED APPLICATIONS

This application is a continuation-in-part of International Patent Application No. PCT/CN2011/084676 with an international filing date of Dec. 26, 2011, designating the United States, now pending, and further claims priority benefits to Chinese Patent Application No. 201010618690.9 filed Dec. 31, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of chemical battery, and more particularly to a method for modifying a positive electrode material for a lithium-ion battery.

2. Description of the Related Art

As a new generation of high-energy battery, the lithium-ion battery features light weight, high power density, high working voltage, and pollution free. Positive electrode materials are critical for manufacturing of the lithium-ion secondary battery, and are the primary factor to determine the performance and the value of the lithium-ion battery.

Studies of the positive electrode material of the lithium-ion battery are mainly focused on lithium-transition metal composite oxides, which include: $LiCoO_2$, $LiFePO_4$, $LiNiO_2$, $LiV_3O_8$, $LiMn_2O_4$, and derivatives thereof. These positive electrode materials have different advantages. For example, $LiCoO_2$ has a high voltage, high specific energy, and superb cycle performance, and has been successfully applied in small lithium-ion batteries. $LiFePO_4$ has a relatively high theoretical capacity (170 mAh/g), superb cycle performance and thermal stability, abundant resource, low price, and is environment-friendly. $LiNiO_2$ has a low discharge rate and low requirement on the electrolyte and is pollution free. $LiV_3O_8$ has a higher specific capacity and is nontoxic and cheep. $LiMn_2O_4$ is characterized in its good stability, pollution free, high working voltage, low price, and convenient synthesis. However, all these materials have a relatively low intrinsic electronic conductivity when serving as the positive electrode materials, thereby seriously affecting high current electrochemical performance and practical application thereof.

SUMMARY OF THE INVENTION

In view of the above-described problems, it is one objective of the invention to provide a method for modifying a positive electrode material for a lithium-ion battery. The resulting positive electrode material modified using the method has a high conductivity.

To achieve the above objective, in accordance with one embodiment of the invention, there is provided a method for modifying a positive electrode material for a lithium-ion battery, the method comprising the following steps:

1) stirring a liquid polyacrylonitrile (LPAN) solution at a temperature of between 80 and 300° C. for between 8 and 72 h to yield a cyclized LPAN solution;
2) adding positive electrode material for a lithium-ion battery, in a powder form, to the cyclized LPAN solution, and evenly mixing a resulting mixture;
3) grinding the mixture, and drying the mixture at room temperature; and
4) calcining the mixture at a temperature of between 500 and 1800° C. for between 6 and 24 h in the presence of an inert gas whereby forming a graphene-like structure by the cyclized LPAN, the graphene-like structure being evenly distributed in the positive electrode material of the lithium-ion battery to yield a graphene-like structure modified positive electrode material of the lithium-ion battery.

In a class of this embodiment, the graphene-like structure comprises between 10 and 100 stacked two-dimensional layers. Each layer comprises grid-like crystal lattice formed by covalent bonded single atoms. The characteristics of graphene-like structure are that: atoms in a plane are combined by strong covalent bonds to form a planar grid structure, and the planar grid structures in different planes are combined in parallel by weak van der Waals forces.

In a class of this embodiment, a solute of the LPAN solution is a liquid polyacrylonitrile having a relative molecular weight of between 106 and 100,000. A solvent of the LPAN solution is water, methanol, ethanol, or a mixture thereof. A concentration of the liquid polyacrylonitrile is between 0.1 and 100 wt. %.

In a class of this embodiment, the liquid polyacrylonitrile is a homopolymer of acrylonitrile.

In a class of this embodiment, the liquid polyacrylonitrile is a copolymer of acrylonitrile and a vinyl monomer. The vinyl monomer is selected from styrene, methyl methacrylate, hydroxyethyl methacrylate, crylic acid, and methylene succinic acid.

In a class of this embodiment, the positive electrode material is selected from the group consisting of: $LiCoO_2$, $LiFePO_4$, $LiNiO_2$, $LiV_3O_8$, $LiMn_2O_4$, $LiCo_xFe_{1-x}O_2$, $LiCo_xNi_{1-x}O_2$, $LiCo_xNi_{1-(x+y)}Mn_yO_2$, $LiNi_xMn_{1-x}O_2$, in which, x, y, and x+y<1.

In a class of this embodiment, the positive electrode material is a precursor or a derivative of $LiCoO_2$, $LiFePO_4$, $LiNiO_2$, $LiV_3O_8$, and $LiMn_2O_4$.

In a class of this embodiment, in step 2), the weight ratio of the LPAN solution to the positive electrode material is 0.01-0.8:1.

In a class of this embodiment, the positive electrode material and the LPAN solution are evenly mixed by stirring or ball grinding.

In a class of this embodiment, the inert gas is nitrogen or argon.

A graphene-like structure modified positive electrode material of a lithium-ion battery prepared by the method has a high conductivity, large specific capacity, and a highly improved cycle performance.

DETAILED DESCRIPTION OF THE EMBODIMENTS

For further illustrating the invention, experiments detailing a method for modifying a positive electrode material for a lithium-ion battery are described below. It should be noted that the following examples are intended to describe and not to limit the invention.

A method for modifying a positive electrode material for a lithium-ion battery, comprises the following steps:
1) stirring a liquid polyacrylonitrile (LPAN) solution at the temperature of between 80 and 300° C. for between 8 and 72 h to yield a cyclized LPAN solution;
2) adding positive electrode material for a lithium-ion battery, in a powder form, to the cyclized LPAN solution, and evenly mixing a resulting mixture;
3) grinding the mixture, and drying the mixture at room temperature; and
4) calcining the mixture at a temperature of between 500 and 1800° C. for between 6 and 24 h in the presence of an inert gas whereby forming a graphene-like structure by the cyclized LPAN, the graphene-like structure being evenly distributed in the positive electrode material of the lithium-ion battery to yield a graphene-like structure modified positive electrode material of the lithium-ion battery.

Figure 1:
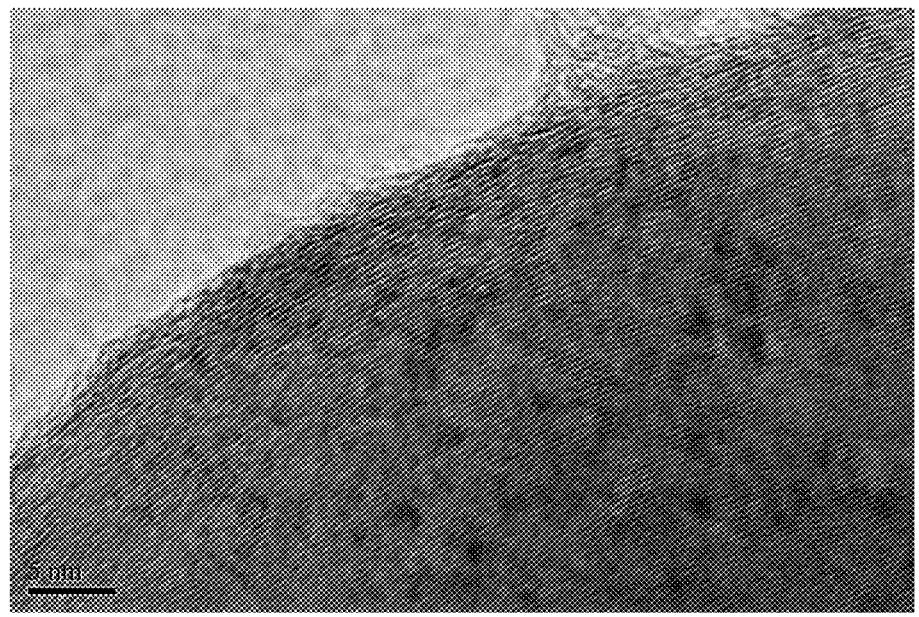
FIG. 1 is a micrograph of a graphene-like structure formed by LPAN under a transmission electron microscope (TEM)
Figure 2:
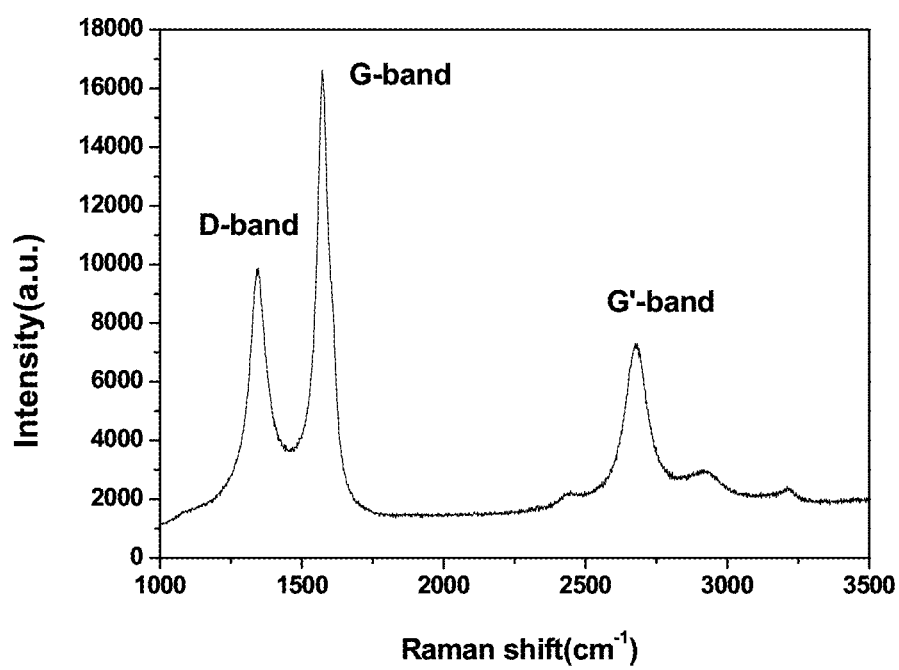
FIG. 2 is a Raman spectra of a graphene-like structure formed by LPAN in accordance with one embodiment of the invention.

The graphene-like structure comprises between 10 and 100 stacked two-dimensional layers. Each layer comprises grid-like crystal lattice formed by covalent bonded single atoms. The characteristics of graphene-like structure are that: atoms in a plane are combined by strong covalent bonds to form a planar grid structure, and the planar grid structures in different planes are combined in parallel by weak van der Waals forces. FIG. 1 shows a micrograph of the graphene-like structure formed by the LPAN under a transmission electron microscope (TEM). FIG. 2 is a Raman spectra of the graphene-like structure formed by the LPAN.

A solute of the LPAN solution is a liquid polyacrylonitrile having the relative molecular weight of between 106 and 100,000, and preferably between 1,600 and 25,000. A solvent of the LPAN solution is water, methanol, ethanol, or a mixture thereof. The concentration of the liquid polyacrylonitrile is between 0.1 and 100 wt. %, and preferably between 10 and 90 wt. %.

The liquid polyacrylonitrile is a homopolymer of acrylonitrile. Optionally, the liquid polyacrylonitrile is a copolymer of acrylonitrile and a vinyl monomer; the vinyl monomer is selected from styrene, methyl methacrylate, hydroxyethyl methacrylate, crylic acid, and methylene succinic acid.

The positive electrode material is selected from the group consisting of: $LiCoO_2$, $LiFePO_4$, $LiNiO_2$, $LiV_3O_8$, $LiMn_2O_4$, $LiCo_xFe_{1-x}O_2$, $LiCo_xNi_{1-x}O_2$, $LiCo_xNi_{1-(x+y)}Mn_yO_2$, $LiNi_xMn_{1-x}O_2$, in which, x, y, and x+y<1.

The positive electrode material is a precursor or a derivative of $LiCoO_2$, $LiFePO_4$, $LiNiO_2$, $LiV_3O_8$, and $LiMn_2O_4$.

In step 2), the weight ratio of the LPAN solution to the positive electrode material is 0.01-0.8:1, and preferably 0.3-0.5:1. The positive electrode material, in a powder form, and the LPAN solution are evenly mixed by stirring or ball grinding. As the cyclized LPAN comprises a large number of functional groups, the LPAN and the positive electrode material are evenly mixed after the stirring or the ball grinding. Besides, part of the functional groups of the LPAN and the positive electrode material are coordinated with each other, so that the mixture is compatible at the molecular level.

The inert gas is nitrogen or argon.

Example 1

Heat 5 g of a LPAN solution comprising 10 wt. % of a PLAN having the relative molecular weight of 1,600 at the temperature of 120° C. for 20 h to yield a cyclized LPAN solution. Add 10 g of powdered $LiFePO_4$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 750° C. for 18 h to yield a positive electrode material comprising a graphene-like modified $LiFePO_4$ powder. Prepare a positive electrode film by mixing 85 wt. % of an active substance, 10 wt. % of an acetylene black, and 5 wt. % of an adhesive. Use a lithium piece as a negative electrode, a Cellgard 2300 porous membrane as a separator, and a mixed solution comprising 1 mol·L$^{-1}$ of $LiPF_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 167 mAh/g when the current density is 0.1 C, and is maintained at 97% after 100 cycles.

Example 2

Heat 5 g of a LPAN solution comprising 10 wt. % of a PLAN having the relative molecular weight of 1,600 at the temperature of 120° C. for 20 h to yield a cyclized LPAN solution. Add 2.342 g of $Li_2CO_3$, 11.386 g of $FeC_2O_4.2H_2O$, and 7.278 g of $NH_4H_2PO_4$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 750° C. for 18 h to yield a positive electrode material comprising a graphene-like material modified $LiFePO_4$ powder. Prepare a positive electrode film by mixing 85 wt. % of an active substance, 10 wt. % of an acetylene black, and 5 wt. % of an adhesive. Use a lithium piece as a negative electrode, a Cellgard 2300 porous membrane as a separator, and a mixed solution comprising 1 mol·L$^{-1}$ of $LiPF_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 161 mAh/g when the current density is 1 C, and is maintained at 96% after 100 cycles.

Example 3

Heat 5 g of a LPAN solution comprising 10 wt. % of a PLAN having the relative molecular weight of 3,000 at the temperature of 120° C. for 20 h to yield a cyclized LPAN solution. Add 10 g of powdered $LiCoO_2$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 750° C. for 8 h to yield a positive electrode material comprising a graphene-like material modified $LiCoO_2$ powder. Prepare a positive electrode film by mixing 85 wt. % of an active substance, 10 wt. % of an acetylene black, and 5 wt. % of an adhesive. Use a lithium piece as a negative electrode, a Cellgard 2300 porous membrane as a separator, and a mixed solution comprising 1 $mol \cdot L^{-1}$ of $LiPF_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 220 mAh/g when the current density is 1 C, and is maintained at 95% after 100 cycles.

Example 4

Heat 5 g of a LPAN solution comprising 10 wt. % of a PLAN having the relative molecular weight of 3,000 at the temperature of 120° C. for 20 h to yield a cyclized LPAN solution. Add 10 g of powdered $LiMn_2O_4$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 750° C. for 8 h to yield a positive electrode material comprising a graphene-like material modified $LiMn_2O_4$ powder. Prepare a positive electrode film by mixing 85 wt. % of an active substance, 10 wt. % of an acetylene black, and 5 wt. % of an adhesive. Use a lithium piece as a negative electrode, a Cellgard 2300 porous membrane as a separator, and a mixed solution comprising 1 $mol \cdot L^{-1}$ of $LiPF_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 140 mAh/g when the current density is 1 C, and is maintained at 96% after 100 cycles.

Example 5

Heat 3 g of a LPAN solution comprising 10 wt. % of a PLAN having the relative molecular weight of 3,000 at the temperature of 120° C. for 30 h to yield a cyclized LPAN solution. Add 10 g of powdered $LiV_{2.95}Ag_{0.05}O_8$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 600° C. for 8 h to yield a positive electrode material comprising a graphene-like material modified $LiV_{2.95}Ag_{0.05}O_8$ powder. Prepare a positive electrode film by mixing 80 wt. % of an active substance, 10 wt. % of an acetylene black, and 10 wt. % of an adhesive. Use a lithium piece as a negative electrode, a Cellgard 2300 porous membrane as a separator, and a mixed solution comprising 1 $mol \cdot L^{-1}$ of $LiPF_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 260 mAh/g when the current density is 1 C, and is maintained at 95% after 100 cycles.

Example 6

Heat 3 g of a LPAN solution comprising 10 wt. % of a PLAN having the relative molecular weight of 10,000 at the temperature of 120° C. for 16 h to yield a cyclized LPAN solution. Add 10 g of powdered $LiMn_{1/3}Co_{1/3}Ni_{1/3}O_4$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 650° C. for 6 h to yield a positive electrode material comprising a graphene-like material modified $LiMn_{1/3}Co_{1/3}Ni_{1/3}O_4$ powder. Prepare a positive electrode film by mixing 80 wt. % of an active substance, 10 wt. % of an acetylene black, and 10 wt. % of an adhesive. Use a lithium piece as a negative electrode, a Cellgard 2300 porous membrane as a separator, and a mixed solution comprising 1 $mol \cdot L^{-1}$ of $LiPF_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 153 mAh/g when the current density is 1 C, and is maintained at 98% after 100 cycles.

Example 7

Heat 3 g of a LPAN solution comprising 90 wt. % of a PLAN having the relative molecular weight of 25,000 at the temperature of 120° C. for 20 h to yield a cyclized LPAN solution. Add 10 g of powdered $LiFePO_4$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 1,100° C. for 8 h to yield a positive electrode material comprising a graphene-like material modified $LiFePO_4$ powder. Prepare a positive electrode film by mixing 85 wt. % of an active substance, 10 wt. % of an acetylene black, and 5 wt. % of an adhesive. Use a lithium piece as a negative electrode, a Cellgard 2300 porous membrane as a separator, and a mixed solution comprising 1 $mol \cdot L^{-1}$ of $LiPF_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 167 mAh/g when the current density is 0.1 C, and is maintained at 97% after 100 cycles.

Example 8

Heat 4 g of a LPAN solution comprising 60 wt. % of a PLAN having the relative molecular weight of 15,000 at the temperature of 120° C. for 20 h to yield a cyclized LPAN solution. Add 10 g of powdered $LiFePO_4$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 900° C. for 10 h to yield a positive electrode material comprising a graphene-like material modified LiFePO$_4$ powder. Prepare a positive electrode film by mixing 85 wt. % of an active substance, 10 wt. % of an acetylene black, and 5 wt. % of an adhesive. Use a lithium piece as a negative electrode, a Cellgard 2300 porous membrane as a separator, and a mixed solution comprising 1 mol·L$^{-1}$ of LiPF$_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 167 mAh/g when the current density is 0.1 C, and is maintained at 97% after 100 cycles.

Example 9

Heat 4 g of a LPAN solution comprising 30 wt. % of a PLAN having the relative molecular weight of 5,000 at the temperature of 120° C. for 20 h to yield a cyclized LPAN solution. Add 10 g of powdered LiFePO$_4$ to the cyclized LPAN solution. Grind a resulting mixture by using a planetary ball grinder; control the ratio of a grinding media to the resulting mixture at 15:1, the speed at 400 rpm, and the grinding time at 8 h; discharge the mixture, and dry the mixture at room temperature. Calcine the mixture in an argon atmosphere at the temperature of 700° C. for 10 h to yield a positive electrode material comprising a graphene-like material modified LiFePO$_4$ powder. Prepare a positive electrode film by mixing 85 wt. % of an active substance, 10 wt. % of an acetylene black, and 5 wt. % of an adhesive. Use a lithium piece as a negative electrode, a Cellgard 2300 porous membrane as a separator, and a mixed solution comprising 1 mol·L$^{-1}$ of LiPF$_6$/EC+DMC (according to a volume ratio of 1:1) as an electrolyte to establish a button battery. Test the electrochemical performance of the button battery by using a Land BS9300 programmed control automatic electrochemical tester (manufactured by Jinnuo Electronics Co., Ltd. Wuhan). The specific discharge capacity of the button battery is 167 mAh/g when the current density is 0.1 C, and is maintained at 97% after 100 cycles.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for modifying a positive electrode material for a lithium-ion battery, the method comprising:

a) stirring a liquid polyacrylonitrile (LPAN) solution at a temperature of between 80 and 300° C. for between 8 and 72 h to yield a cyclized LPAN solution;
b) adding positive electrode material for a lithium-ion battery, in a powder form, to the cyclized LPAN solution, and evenly mixing a resulting mixture;
c) grinding the mixture, and drying the mixture at room temperature; and
d) calcining the mixture at a temperature of between 500 and 1800° C. for between 6 and 24 h in the presence of an inert gas whereby forming a graphene-like structure by the cyclized LPAN, the graphene-like structure being evenly distributed in the positive electrode material of the lithium-ion battery to yield a graphene-like structure modified positive electrode material of the lithium-ion battery.

2. The method of claim 1, wherein the graphene-like structure comprises between 10 and 100 stacked two-dimensional layers, and each layer comprises grid-like crystal lattice formed by covalent bonded single atoms.

3. The method of claim 1, wherein
a solute of the LPAN solution is a liquid polyacrylonitrile having a relative molecular weight of between 106 and 100,000;
a solvent of the LPAN solution is water, methanol, ethanol, or a mixture thereof; and
a concentration of the liquid polyacrylonitrile is between 0.1 and 100 wt. %.

4. The method of claim 3, wherein the liquid polyacrylonitrile is a homopolymer of acrylonitrile.

5. The method of claim 3, wherein
the liquid polyacrylonitrile is a copolymer of acrylonitrile and a vinyl monomer; and
the vinyl monomer is selected from styrene, methyl methacrylate, hydroxyethyl methacrylate, crylic acid, and methylene succinic acid.

6. The method of claim 1, wherein the positive electrode material is selected from the group consisting of: LiCoO$_2$, LiFePO$_4$, LiNiO$_2$, LiV$_3$O$_8$, LiMn$_2$O$_4$, LiCo$_x$Fe$_{1-x}$O$_2$, LiCo$_x$Ni$_{1-x}$O$_2$, LiCo$_x$Ni$_{1-(x+y)}$Mn$_y$O$_2$, and LiNi$_x$Mn$_{1-x}$O$_2$, in which, x, y, and x+y<1.

7. The method of claim 1, wherein the positive electrode material is a precursor or a derivative of LiCoO$_2$, LiFePO$_4$, LiNiO$_2$, LiV$_3$O$_8$, and LiMn$_2$O$_4$.

8. The method of claim 1, wherein in step b), a weight ratio of the LPAN solution to the positive electrode material is 0.01-0.8:1.

9. The method of claim 1, wherein the positive electrode material and the LPAN solution are evenly mixed by stirring or ball grinding.

10. The method of claim 1, wherein the inert gas is nitrogen or argon.

* * * * *